US012426686B2

(12) United States Patent
Nanbu et al.

(10) Patent No.: US 12,426,686 B2
(45) Date of Patent: Sep. 30, 2025

(54) FASTENING PART, METHOD OF PRODUCING THE SAME, AND MOLD DEVICE

(71) Applicant: YKK Corporation, Tokyo (JP)

(72) Inventors: Madoka Nanbu, Toyama (JP); Yohei Shimizu, Toyama (JP)

(73) Assignee: YKK CORPORATION, Tokyo (JP)

( * ) Notice: Subject to any disclaimer, the term of this patent is extended or adjusted under 35 U.S.C. 154(b) by 132 days.

(21) Appl. No.: 18/204,094

(22) Filed: May 31, 2023

(65) Prior Publication Data

US 2023/0389658 A1 Dec. 7, 2023

(30) Foreign Application Priority Data

Jun. 6, 2022 (JP) ................. 2022-091836

(51) Int. Cl.
*A44B 18/00* (2006.01)
*B29C 45/26* (2006.01)
*B29L 31/00* (2006.01)

(52) U.S. Cl.
CPC .......... *A44B 18/0019* (2013.01); *B29C 45/26* (2013.01); *B29L 2031/729* (2013.01)

(58) Field of Classification Search
CPC ............ A44B 18/0019; A44B 18/0049; A44B 18/0015; A44B 18/0061; A44B 18/0065; A44B 18/0053; A44B 18/0007; B29C 45/26; B29L 2031/729; Y10T 24/2792
See application file for complete search history.

(56) References Cited

U.S. PATENT DOCUMENTS

| | | | | |
|---|---|---|---|---|
| 3,824,933 A | * | 7/1974 | Lind .................. | B65D 19/0012 |
| | | | | 108/56.1 |
| 5,799,378 A | * | 9/1998 | Gershenson ....... | A44B 18/0065 |
| | | | | 24/452 |
| 5,983,467 A | * | 11/1999 | Duffy .................. | A61F 13/5622 |
| | | | | 24/584.1 |
| 7,246,416 B2 | | 7/2007 | Duffy | |

(Continued)

FOREIGN PATENT DOCUMENTS

| | | |
|---|---|---|
| JP | H03-205001 A | 9/1991 |
| JP | 2586918 Y | 12/1998 |
| JP | WO2019/107444 A1 | 1/2021 |

*Primary Examiner* — Jason W San
*Assistant Examiner* — Rowland Do
(74) *Attorney, Agent, or Firm* — Procopio, Cory, Hargreaves & Savitch LLP

(57) ABSTRACT

Fastening part includes: a two-dimensional arrangement of engagement elements including a plurality of engagement elements arranged corresponding to a plurality of lattice points of a planar lattice; a plurality of first ribs; a plurality of second ribs, and a plurality of apertures formed in a fastening region in which the two-dimensional arrangement is provided. The first rib connects the engagement elements adjacently arranged in a first direction. The second rib connects the engagement elements adjacently arranged in a second direction that is different from the first direction. The plurality of first ribs and/or the plurality of second ribs is arranged to allow the plurality of apertures to include two or more apertures each having an aperture area corresponding to two or more unit cells of the planar lattice.

15 Claims, 12 Drawing Sheets

(56) References Cited

U.S. PATENT DOCUMENTS

| | | | |
|---|---|---|---|
| 2003/0074771 A1* | 4/2003 | Duffy | A44B 18/0049 24/442 |
| 2005/0177986 A1* | 8/2005 | Clarner | B29C 43/222 24/452 |
| 2008/0018025 A1* | 1/2008 | Duffy | A44B 18/0073 264/503 |
| 2008/0034560 A1* | 2/2008 | Duffy | A44B 18/0049 156/60 |
| 2013/0000085 A1* | 1/2013 | Cina | A44B 18/0065 83/13 |
| 2021/0100323 A1 | 4/2021 | Takakuwa et al. | |

* cited by examiner

[Figure 1]
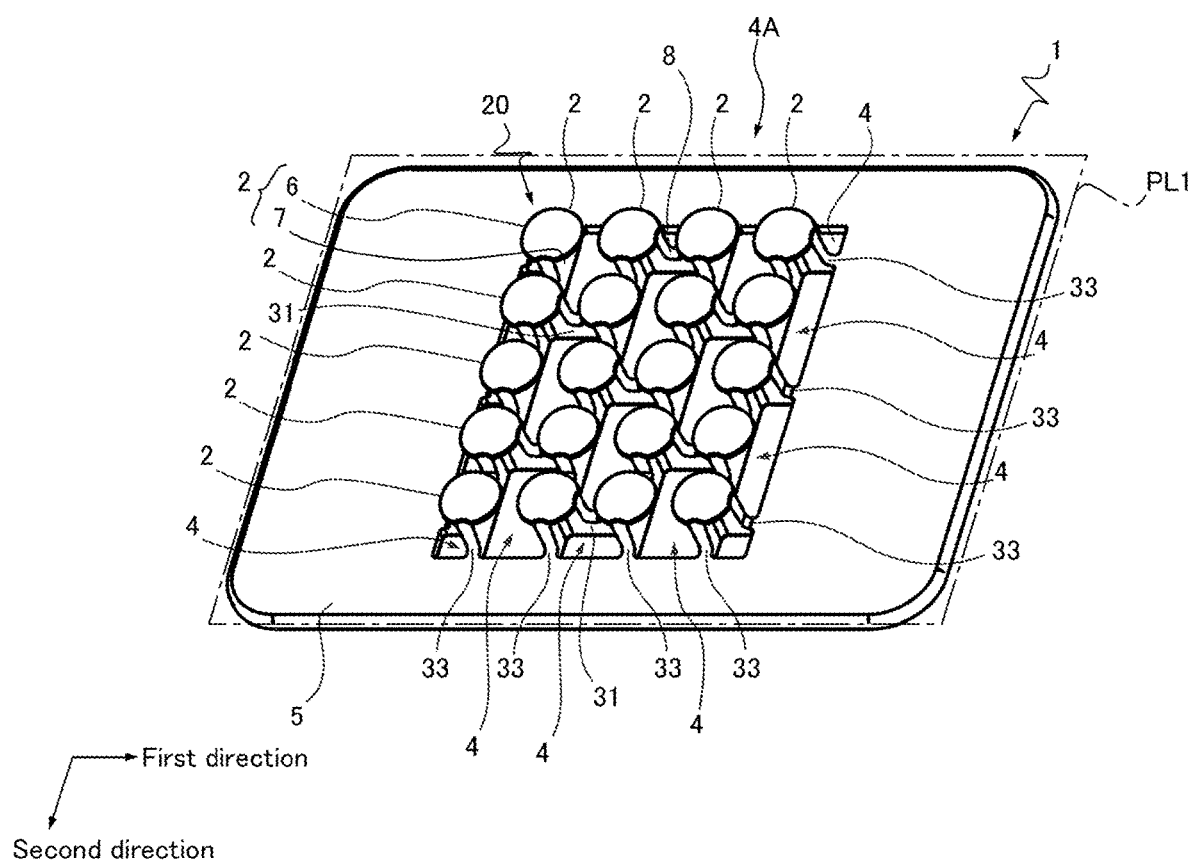

[Figure 2]
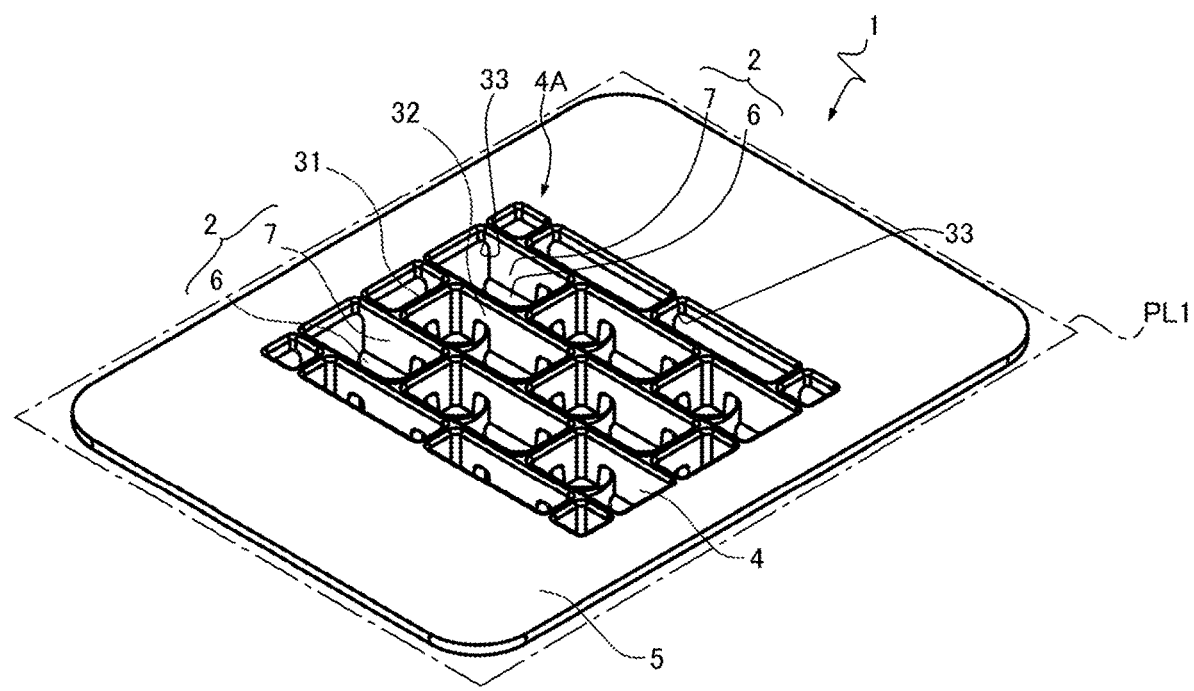

[Figure 3]
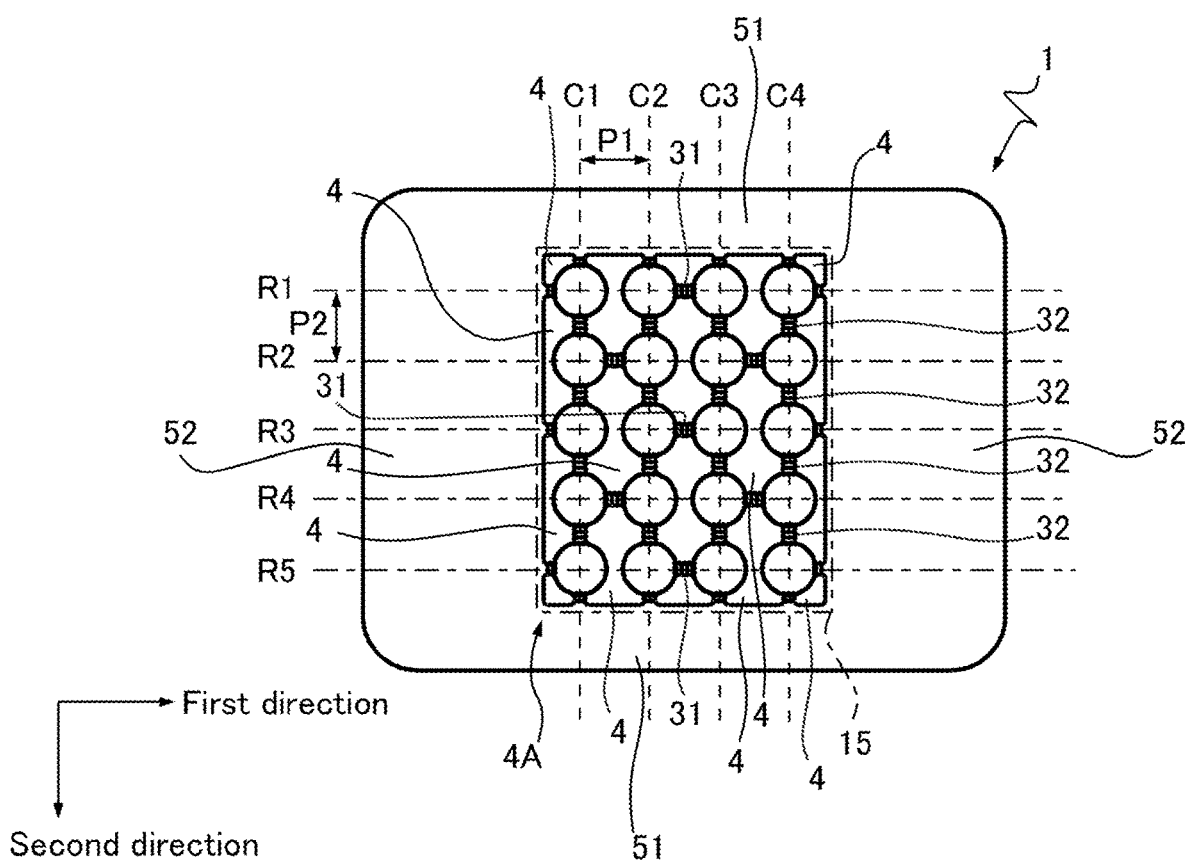

[Figure 4]
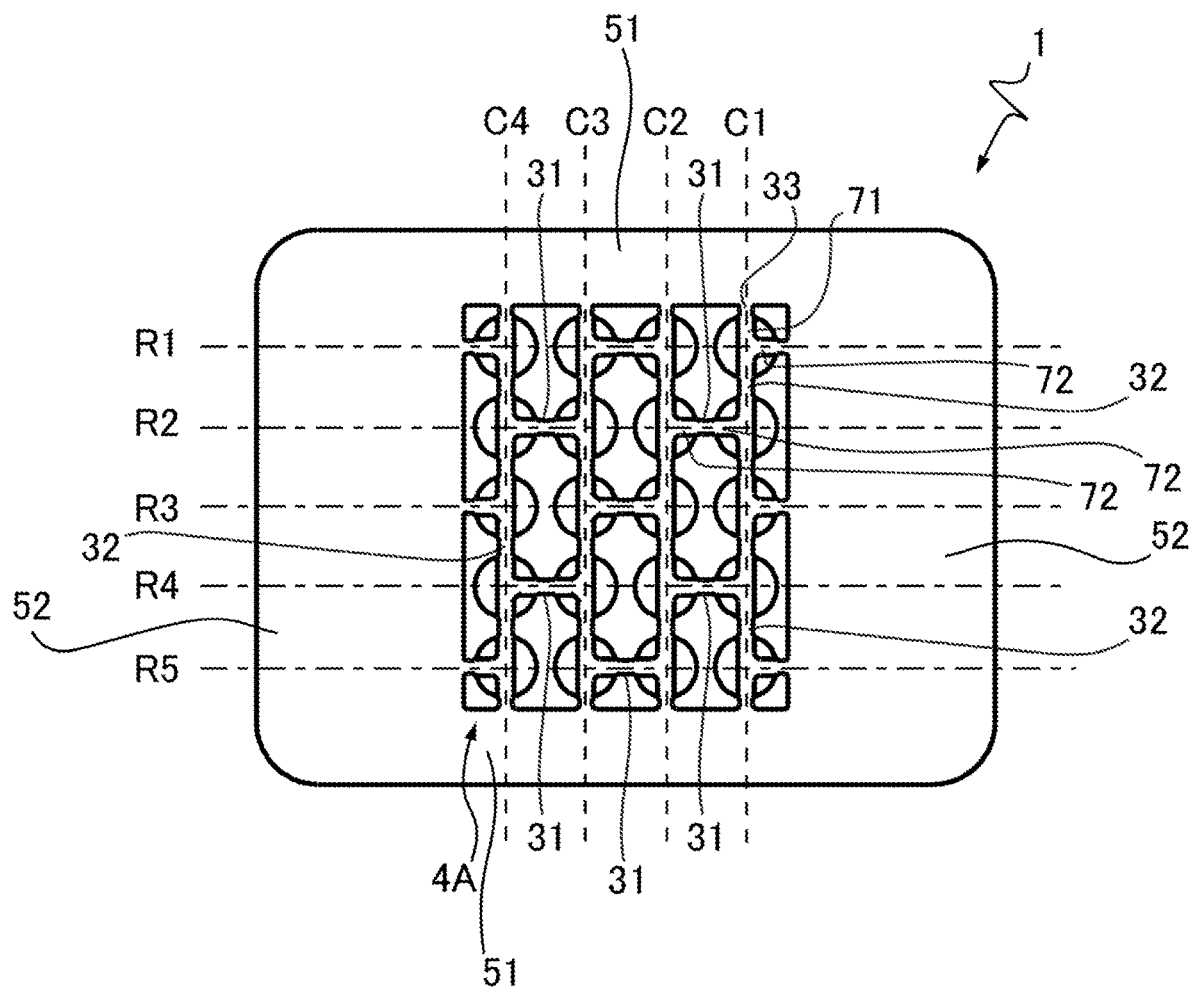

[Figure 5]
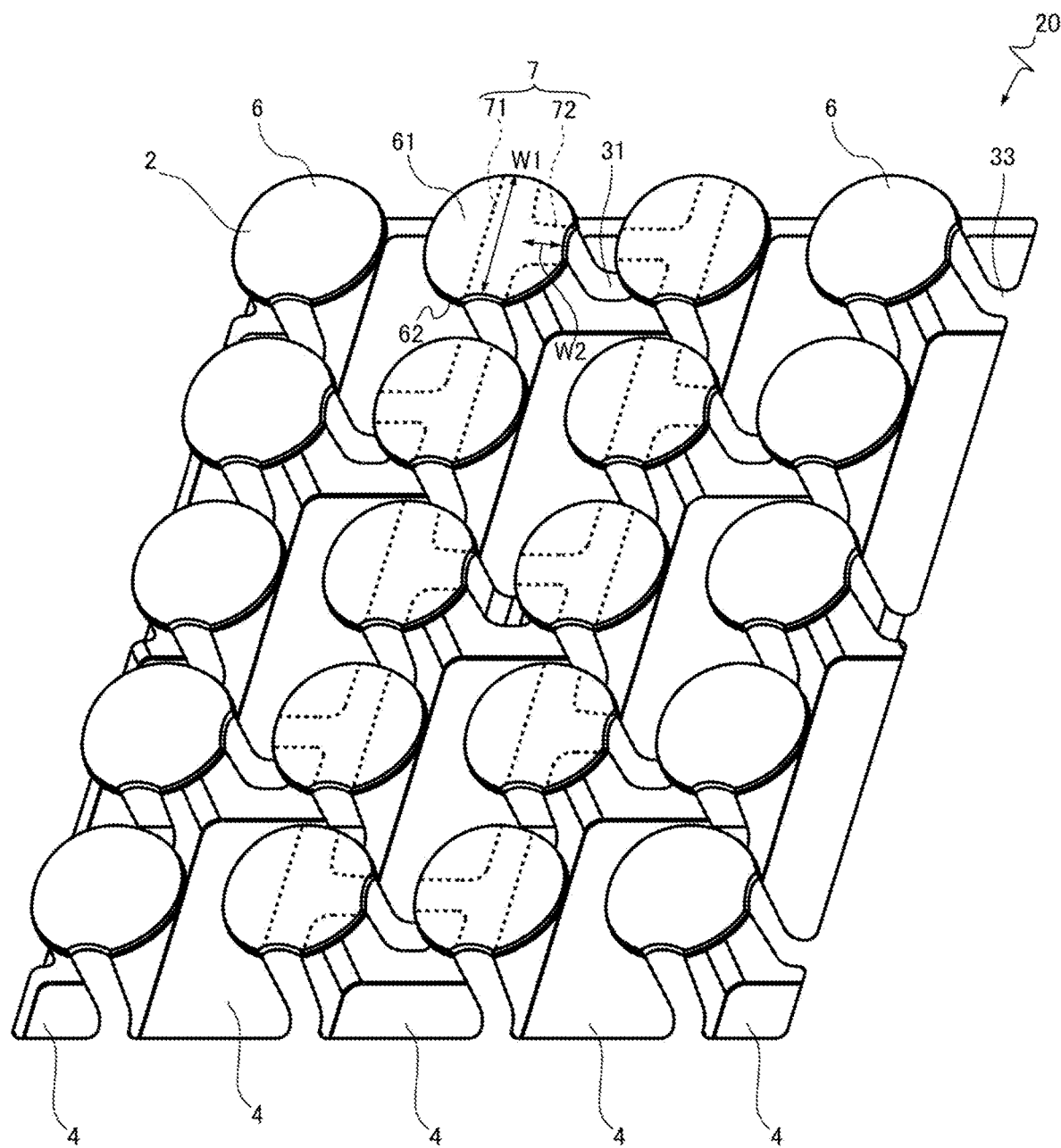

[Figure 6]
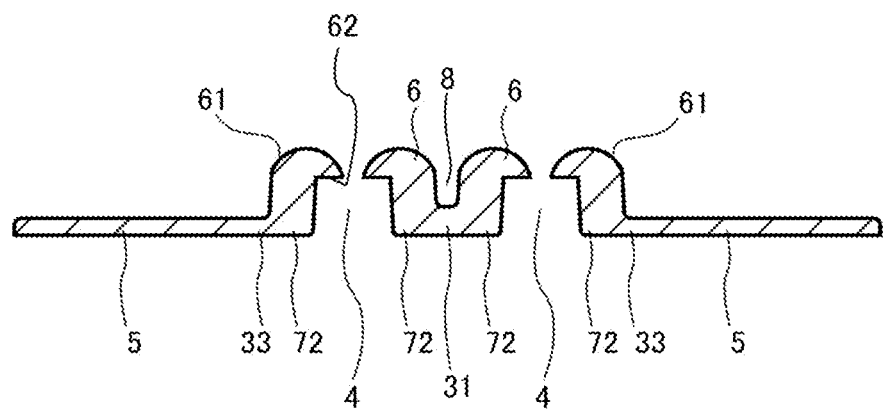
[Figure 7]
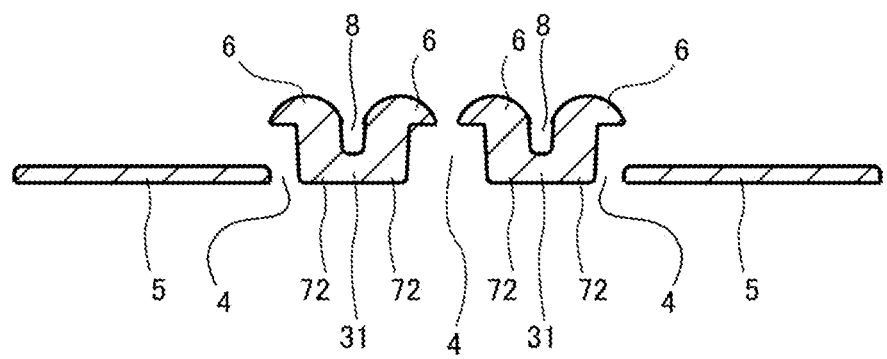
[Figure 8]
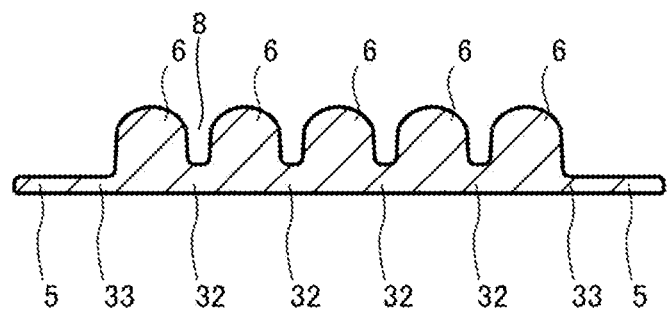

[Figure 9]
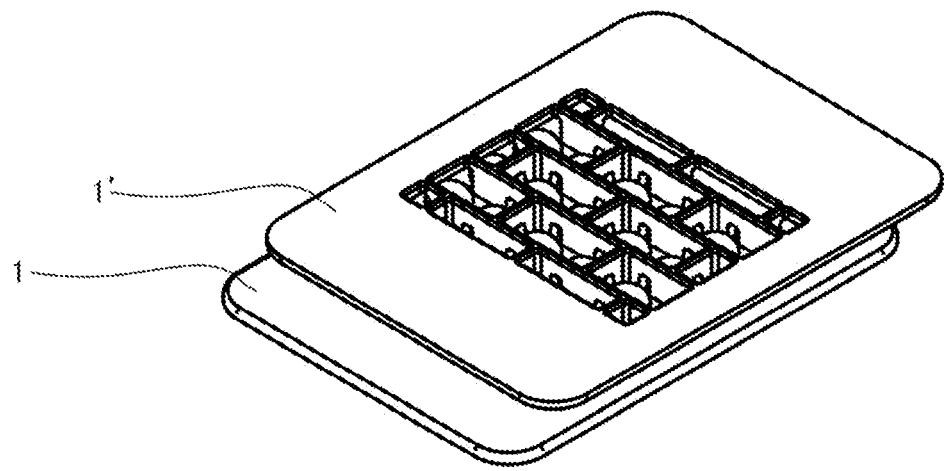
[Figure 10]
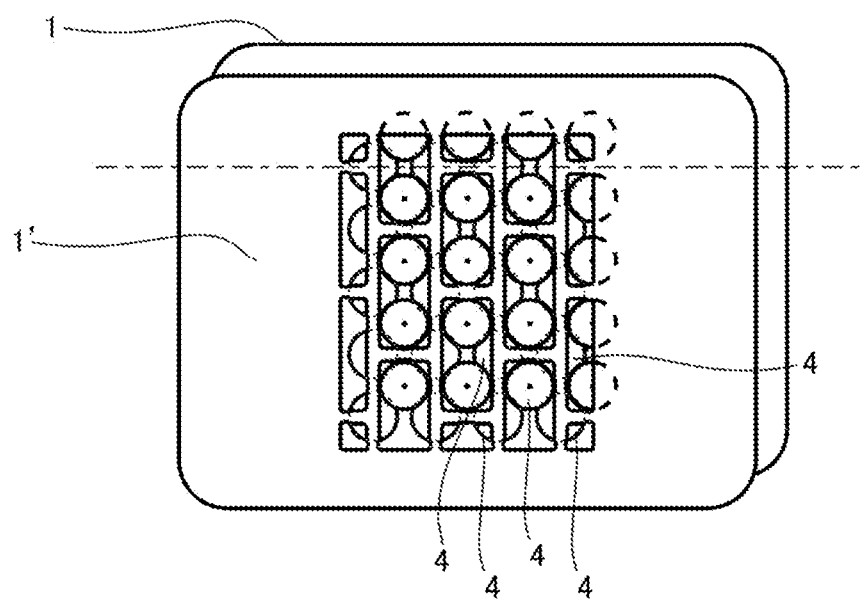
[Figure 11]
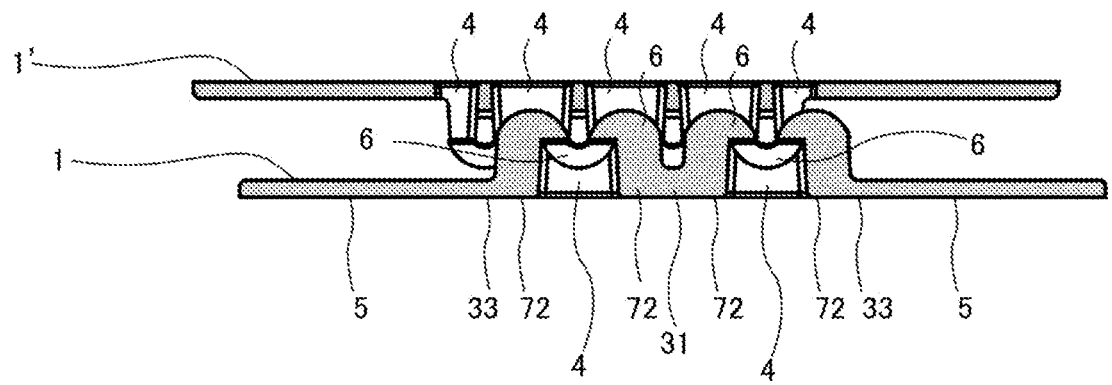

[Figure 12]
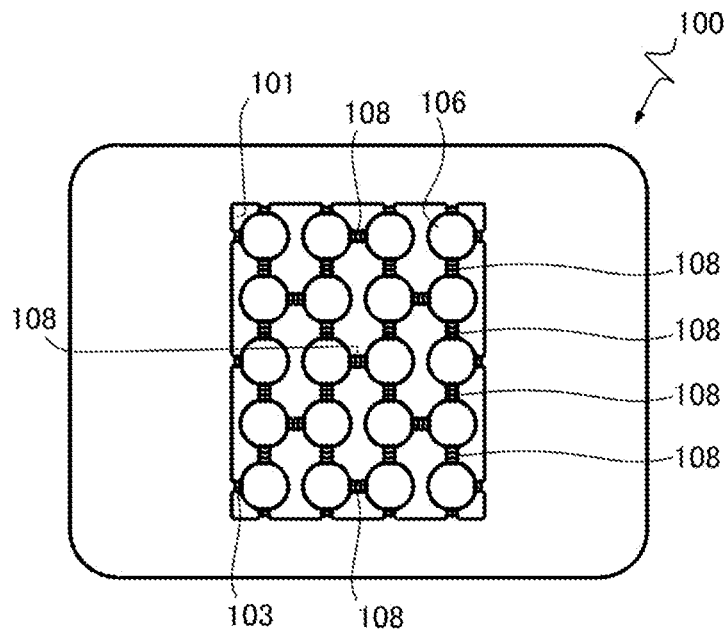
[Figure 13]
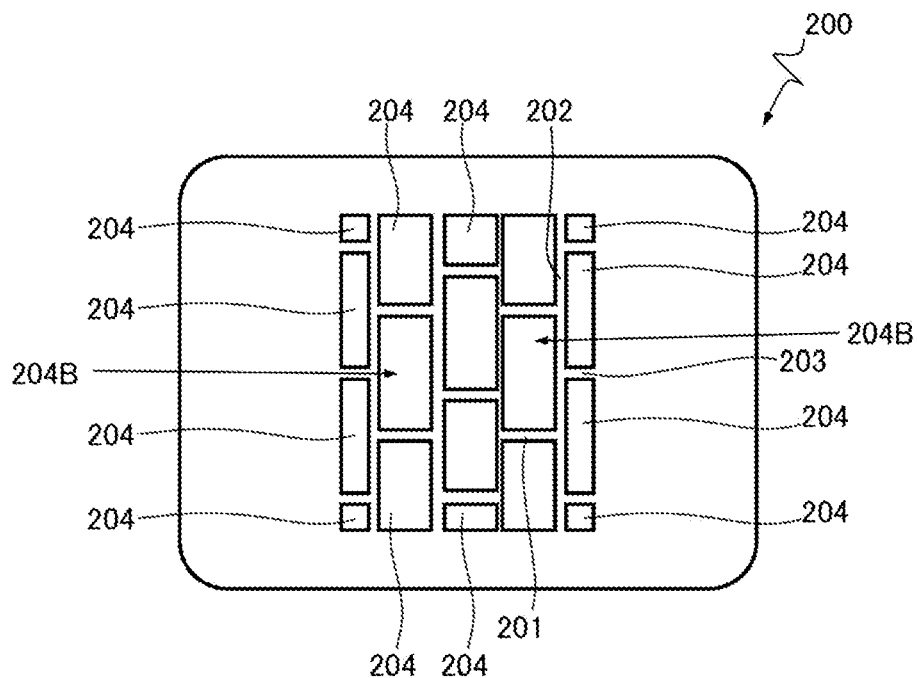

[Figure 14]
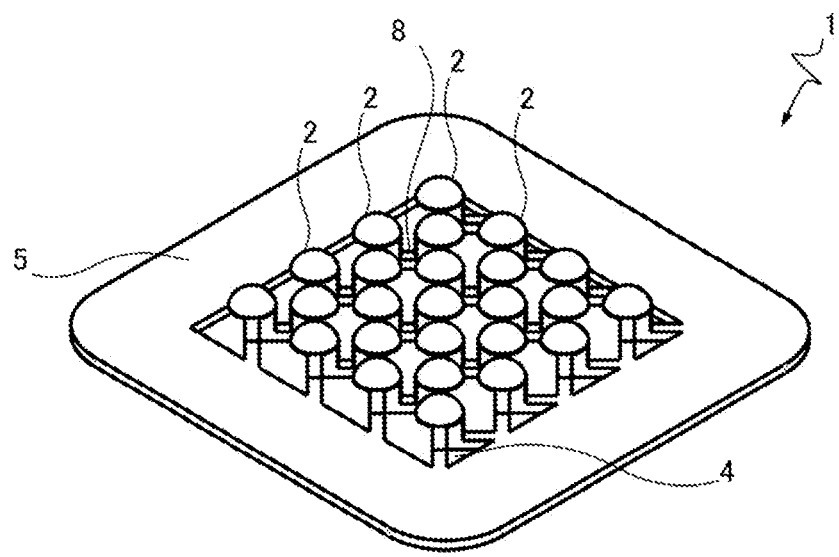
[Figure 15]
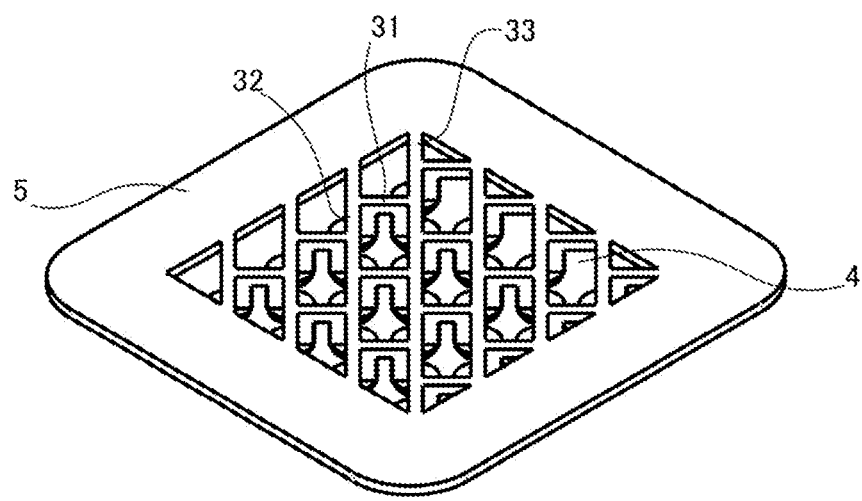

[Figure 16]
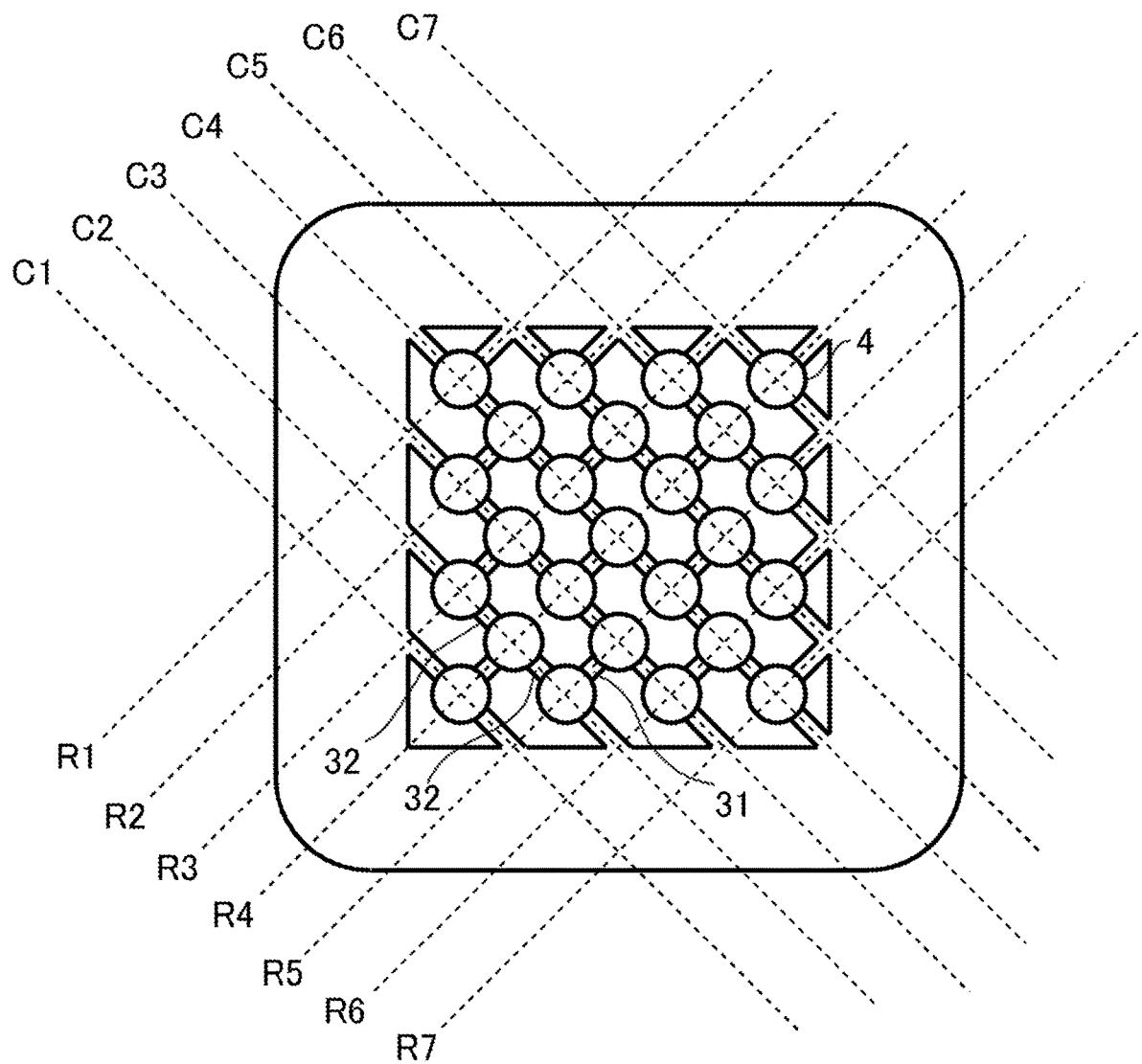

[Figure 17]
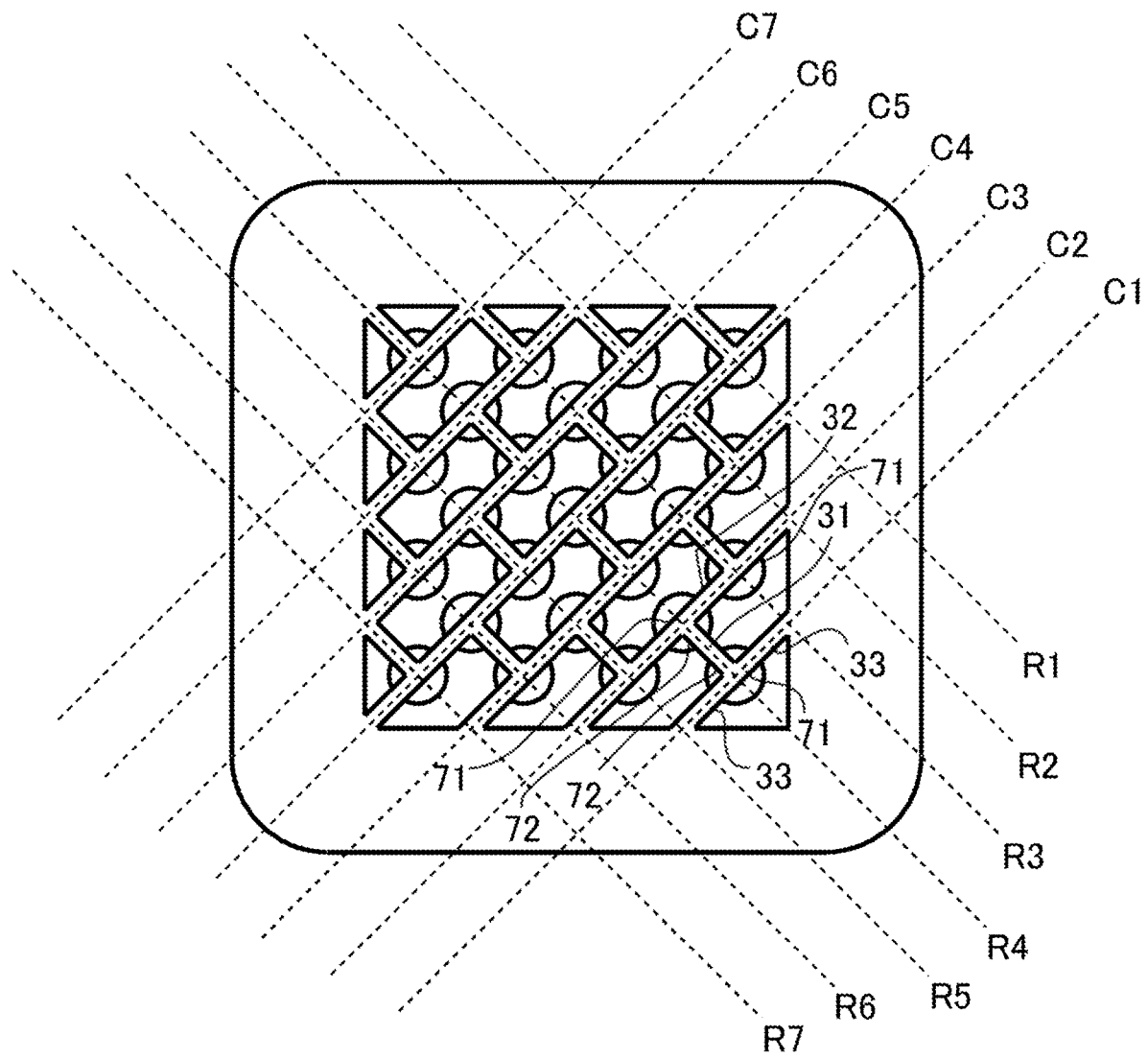

[Figure 18]
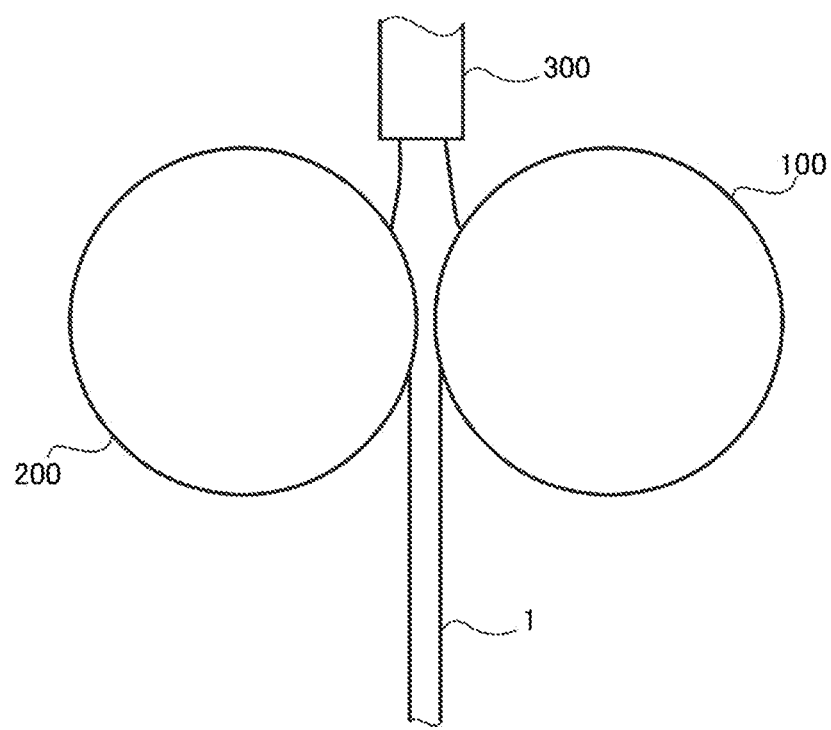

FASTENING PART, METHOD OF PRODUCING THE SAME, AND MOLD DEVICE

CROSS-REFERENCE TO RELATED APPLICATIONS

This application claims a benefit of Japanese Patent Application No. 2022-091836 filed in Japan on Jun. 6, 2022, the entire content of which is hereby incorporated by reference.

FIELD OF THE DISCLOSURE

The present invention relates to a fastening part, a method of producing the same and a mold device.

BACKGROUND

U.S. Pat. No. 7,246,416 discloses a fastening part in which multiple engagement elements are arranged on a base where multiple windows are formed (See FIG. 1 of the same literature).

International Publication No. 2019/107444 discloses a surface fastener entirely formed of thermoplastic elastomer. Plural first strands and plural second strands cross to form multiple holes. The surface fastener is produced through stretching as illustrated in FIG. 4 of the same literature.

Other types of surface fasteners are also known (e.g. see Japanese Registered Utility Model No. 2586918, and Japanese Patent Application Laid-open No. 3-205001).

In a case where a mold is provided with protrusions to form apertures in a fastening part, the protrusions of the mold would suffer a higher risk of damage proportional to the number of the protrusions in the mold. The lifespan of the mold directly affects the production cost of fastening part, and thus it is desirable to avoid or inhibit the shortened lifespan of the mold.

SUMMARY

Prolonged lifespan of a mold used for production of fastening part may be facilitated by modifying a structure of fastening part, as newly identified by the present inventors.

Fastening part according to embodiment 1 of the present disclosure includes: a two-dimensional arrangement of engagement elements including a plurality of engagement elements arranged corresponding to a plurality of lattice points of a planar lattice; a plurality of first ribs each connecting the engagement elements adjacently arranged in a first direction in the two-dimensional arrangement; a plurality of second ribs each connecting the engagement elements adjacently arranged in a second direction in the two-dimensional arrangement, the second direction different from the first direction; and a plurality of apertures formed in a fastening region in which the two-dimensional arrangement is provided. The plurality of first ribs and/or the plurality of second ribs is arranged to allow the plurality of apertures to include two or more apertures each having an aperture area corresponding to two or more unit cells of the planar lattice.

In some embodiments, (i) the plurality of apertures are formed as net openings in accordance with at least the plurality of first ribs and the plurality of second ribs in the fastening region; and/or (ii) each of said two or more apertures is wider in one direction of the first and second directions and narrower in the other direction of the first and second directions; and/or (iii) each of said two or more apertures has the aperture area corresponding to two or three unit cells in the planar lattice.

In one of or any combination of the above-described embodiments, the unit cell of the planar lattice and/or an aperture shape of the aperture may be square, rectangle, parallelogram or rhombus.

In one of or any combination of the above-described embodiments, the fastening part may further include: a base frame that surrounds the fastening region; and a plurality of third ribs each connecting, to the base frame, the engagement element at outermost position in the two-dimensional arrangement. Embodiment is envisaged where the first rib and/or the second rib is thicker than the base frame, and the third rib is thinner than the first rib and/or the second rib.

In one of or any combination of the above-described embodiments, each engagement element of the plurality of engagement elements may include at least an engagement head and a stem, and the stem may have a T-shaped cross section in a plane parallel to the planar lattice. Embodiment is envisaged where the stem includes a first stem wall connected to the engagement head, the first stem wall having a first width ranging from one end to the other end of the engagement head in one direction of the first and second directions; and a second stem wall connected to the engagement head, the second stem wall having a second width ranging from one end of the engagement head to the first stem wall in the other direction of the first and second directions. The engagement head may include a curved top surface and a flat locking surface located at the opposite side of the top surface.

In one of or any combination of the above-described embodiments, a number of the first ribs may be equal to or less than ⅔ or ½ of a total number of the first ribs allocatable for connection between the engagement elements in the fastening region (or in the planar lattice). Embodiments is envisioned where a number of the second ribs is equal to a total number of the second ribs allocatable for connection between the engagement elements in the fastening region (or in the planar lattice). Density of the engagement elements in the two-dimensional arrangement may be in a range of 2 to 28 elements per $cm^2$. Total number of the apertures in the fastening region may be equal to or greater than total number of the unit cells in the planar lattice.

Mold device according to another aspect of the present disclosure is a mold device configured to produce a fastening part of any one of the above-described fastening parts, the mold device including: a first mold; and a second mold, the first mold including a plurality of recesses that respectively mold at least the engagement heads of the engagement elements in the two-dimensional arrangement, the second mold including a plurality of block portions arranged corresponding to the plurality of apertures, the plurality of block portions including two or more block portions each having an area corresponding to two or more unit cells of the planar lattice. In some embodiments, the plurality of block portions includes plural types of block portions that are different in width and length when a main surface of the second mold is viewed in front, the length orthogonal to the width. The present disclosure also relates to a method of producing fastening parts using the above-discussed mold device.

According to an aspect of the present disclosure, a fastening part may be supplied which may facilitate the prolonged lifespan of mold.

BRIEF DESCRIPTION OF DRAWINGS

FIG. 1 is a perspective upside schematic of fastening part according to an aspect of the present disclosure.

FIG. 2 is a perspective downside schematic of the fastening part.

FIG. 3 is a schematic top view of the fastening part.

FIG. 4 is a schematic bottom view of the fastening part.

FIG. 5 is an expanded perspective view of two-dimensional arrangement of engagement elements. FIG. 5 also schematically discloses a manner of connection between an engagement head and a stem in the engagement element.

FIG. 6 is a schematic end view of the fastening part, illustrating an end view taken along imaginary line R1, R3, R5 extending in row direction in FIG. 3.

FIG. 7 is a schematic end view of the fastening part, illustrating an end view taken along imaginary line R2, R4 extending in row direction in FIG. 3.

FIG. 8 is a schematic end view of the fastening part, illustrating an end view taken along imaginary line C1, C2, C3, C4 extending in column direction in FIG. 3.

FIG. 9 is a schematic perspective view of a fastening device constructed from a pair of fastening parts which are made of same material and structured identically.

FIG. 10 is an elevational view of the fastening device illustrating a manner of engagement between the fastening parts.

FIG. 11 is a cross-sectional view of the fastening device illustrating a manner of engagement between the fastening parts.

FIG. 12 is an elevational view of a first mold used for production of fastening part.

FIG. 13 is an elevational view of a second mold used for production of fastening part.

FIG. 14 is a perspective upside schematic of a fastening part according to another aspect of the present disclosure.

FIG. 15 is a perspective downside schematic of the fastening part of FIG. 14.

FIG. 16 is a schematic top view of the fastening part of FIG. 14.

FIG. 17 is a schematic bottom view of the fastening part of FIG. 14.

FIG. 18 is a schematic view that illustrates an exemplary process using die wheels.

DETAILED DESCRIPTION

Hereinafter, non-limiting embodiments and features of the present invention will be described with reference to drawings. A skilled person would be able to combine respective embodiments and/or respective features without requiring excess description, and would appreciate synergistic effects of such combinations. Overlapping description among the embodiments are basically omitted. Referenced drawings aim mainly for describing inventions and are simplified for the sake of convenience of illustration. The respective features should be appreciated as universal features not only effective to fastening parts presently disclosed but also effective to other various fastening parts not disclosed in the present specification.

Descriptions will be made to a fastening part 1 with reference to FIGS. 1-8. FIG. 1 is a perspective upside schematic of the fastening part 1 according to an aspect of the present disclosure. FIG. 2 is a perspective downside schematic of the fastening part 1. FIG. 3 is a schematic top view of the fastening part 1. FIG. 4 is a schematic bottom view of the fastening part 1. FIG. 5 is an expanded perspective view of a two-dimensional arrangement 20 of engagement elements 2. FIG. 6 is a schematic end view of the fastening part 1, illustrating an end view taken along imaginary line R1, R3, R5 extending in row direction in FIG. 3.

FIG. 7 is a schematic end view of the fastening part 1, illustrating an end view taken along imaginary line R2, R4 extending in row direction in FIG. 3. FIG. 8 is a schematic end view of the fastening part 1, illustrating an end view taken along imaginary line C1, C2, C3, C4 extending in column direction in FIG. 3.

The fastening part 1 is designed to be engageable and disengageable with another fastening part structured identically, i.e. it may be a type of hook-to-hook fastening part. The fastening part 1 is made of soft and elastic material (e.g. thermoplastic elastomer (TPE)), and has both softness and a capability of retaining its shape (shape stability). In particular, the fastening part 1 can bend and deflect in accordance with applied external force, but can recover to the initial shape after the applied force is removed. Thus, it would be possible to repeatedly perform engaging and disengaging of the fastening parts 1 for a long period of time. Typically, the fastening part 1 is provided with engagement elements which are larger in size relative to male elements of common surface fastener, and its density may be in a range of 2 to 28 elements per $cm^2$ for example but should not necessarily be limited to this. Of course, various features in the present disclosure do not premise such a type of the fastening part (i.e. this is not a requisite). Thermoplastic Polyurethane (TPU) and Thermoplastic Styrene (TPS) can be named as example of thermoplastic elastomer usable for the fastening part 1, but should not be limited to this.

The fastening part 1 has a two-dimensional arrangement 20 of hook-type engagement elements 2, a plurality of first ribs 31, a plurality of second ribs 32, a plurality of third ribs 33 and a group 4A of apertures and a base frame 5. In the two-dimensional arrangement 20 of the engagement elements 2, the plurality of engagement elements 2 is arranged corresponding to a plurality of lattice points of a planar lattice set in a plane PL1. Typically, the planar lattice may be one of square lattice, rectangular lattice, parallelogram lattice and rhombus lattice. Note that a unit cell (a minimum unit) of the square lattice is square. A unit cell (a minimum unit) of the rectangular lattice is rectangle (oblong). A unit cell (a minimum unit) of the parallelogram lattice is parallelogram. A unit cell (a minimum unit) of the rhombus lattice is rhombus. In any type of the unit cells, the respective lattice points are aligned in a first direction and aligned in a second direction that is different from the first direction, resulting in the formation of the two-dimensional arrangement 20. The first direction and the second direction may cross at arbitrary angle. In the square and rectangular lattices, the first direction and the second direction are orthogonal. In the parallelogram and rhombus lattices, the first direction and the second direction are not orthogonal and cross at a given angle. Note that it is possible not to arrange the engagement elements 2 to all of the lattice points of the planar lattice but possible to omit several engagement elements 2 to be arranged to several lattice points.

FIGS. 3 and 4 will be referred for a purpose of clearer and detail descriptions. Square lattice shown in FIGS. 3 and 4 is defined by imaginary lines R1 to R5 parallel to a first direction (a row direction here) and imaginary lines C1 to C4 parallel to a second direction (a column direction here). Number of the imaginary lines parallel to the first direction may be in a range between 3 to 15. The same applies to the number of imaginary lines parallel to the second direction. The imaginary lines R1 to R5 are arranged at a constant pitch. The same applies to the imaginary lines C1 to C4. In a case of square lattice, the pitch P1 of the imaginary lines C1 to C4 is equal to the pitch P2 of the imaginary lines R1 to R5, but those pitches could be different if other types of planar lattices were employed. The pitch P1 is equal to an interspace between lattice points in the first direction. The pitch P2 is equal to an interspace between lattice points in the second direction. Typically, the interspace between the lattice points in the first and second directions is in a range between 1.9 mm to 6.5 mm.

Descriptions will be made with a particular attention to the imaginary lines R1 to R5. Nodes between the imaginary line R1 and the respective imaginary lines C1 to C4 are lattice points, and the engagement elements 2 are arranged on the imaginary line R1 at a constant pitch to form a linear arrangement of the engagement elements 2 along the first direction. The same applies to other imaginary lines R2 to R5. As such, a group of linear arrangements of the engagement elements 2 on the imaginary lines R1 to R5 form the above-described two-dimensional arrangement 20. Descriptions will be made with a particular attention to the imaginary lines C1 to C4. Nodes between the imaginary line C1 and the respective imaginary lines R1 to R5 are lattice points, and the engagement elements 2 are arranged on the imaginary line C1 at a constant pitch to form a linear arrangement of the engagement elements 2 along the second direction. The same applies to other imaginary lines C2 to C4. As such, a group of linear arrangements of the engagement elements 2 on the imaginary lines C1 to C4 form the above-described two-dimensional arrangement 20. Note that every lattice points are in the plane PL1.

Each engagement element 2 is of a type of hook not a type of loop, and typically includes at least an engagement head 6 and a stem 7. The engagement head 6 has a curved top surface 61 and a flat locking surface 62 located at the opposite side of the top surface 61. The top surface 61 faces upside (in a direction away from the first rib 31, the second rib 32 and the base frame 5), and the locking surface 62 faces downside (in a direction toward the first rib 31, the second rib 32 and the base frame 5). For a purpose of simplified molding or for other objects, the engagement head 6 may be shaped to have a spherical crown or hemisphere which is a shape imaginarily obtainable by cutting a sphere by a plane. The engagement head 6 has a circular profile when viewed from above as shown in FIG. 3, but could have other shapes such as oval, cross and star. Maximum width (or maximum diameter) of the engagement head 6 in the first and second directions may be in a range of 70% to 95% of the interspace between lattice points in the first and second directions, e.g. in a range between 1 mm to 5 mm. The locking surface 62 may be a surface parallel to a plane PL1 in which the base frame 5 is arranged or the planar lattice exists.

The stem 7 may be connected to plural ribs. Moreover, the stem 7 may have a T-shaped cross section in a plane parallel to the planar lattice or the plane PL1 in which the planar lattice exists (See FIG. 5). This may be a result of that total three ribs are connected to one engagement element 2 (here, the first to third ribs 31,32,33 are totally referred to as "rib" as a generic term without distinguishing them). In other words, each engagement element 2 may be connected to neighboring engagement elements and/or the base frame 5 via the total 3 ribs. This allows suitable balancing between softness and mechanical strength of the fastening part 1. In the illustrated example, this feature is applicable to all of the engagement elements 2, but it would be possible to allocate two or four ribs per an engagement element 2 with respect to several ones of the engagement elements 2.

Advantageously, the stem 7 includes a first stem wall 71 connected to the engagement head 6 and having a first width W1 ranging from one end to the other end of the engagement head 6 in one direction of the first and second directions (the second direction in FIG. 5); and a second stem wall 72 connected to the engagement head 6 and having a second width W2 ranging from one end of the engagement head 6 to the first stem wall 71 in the other direction of the first and second directions (the first direction in FIG. 5). The engagement head 6 and the stem 7 are directly connected without a gap as noted above, allowing simplified structure of mold for production of the fastening part 1 (e.g. use of vertically separable dies only, for example) and/or facilitating the prolonged lifespan of the mold. Note that, the engagement elements 2 are connected via linear ribs such as the first rib 31 and the second rib 32, ensuring adequate softness of the entirety of the fastening part 1.

In a case where the fastening parts 1 are to be engaged in the up-down direction, the respective top surfaces 61 of the engagement heads 6 in the upper and lower fastening parts 1 are brought into contact, and the fastening parts 1 would be properly aligned owing to the curved top surfaces 61 of those engagement heads 6 (i.e. the top surface 61 serves as a guide surface for alignment of the fastening parts 1). As the upper and lower fastening parts 1 are engaged, the locking surfaces 62 of the engagement elements 2 of the upper and lower fastening parts 1 are brought into contact (e.g. partial contact). Increase or decrease of the contact area between the locking surfaces 62 allows modification of locking strength between the fastening parts 1 per a unit area and modification of force required to engage the fastening parts 1 per a unit area.

The first rib 31 connects the engagement elements 2 (e.g. its stems 7) adjacent in the first direction in the two-dimensional arrangement 20. The second rib 32 connects the engagement elements 2 (e.g. its stems 7) adjacent in the second direction, which is different from the first direction, in the two-dimensional arrangement 20. The third rib 33 connects, with the base frame 5, an engagement element 2 (e.g. its stem 7) positioned at the outermost position (the outermost circumference) in the two-dimensional arrangement 20. Note that, in an embodiment where the base frame 5 is omitted, the third rib 33 may also be omitted or may be provided for other purposes than connection to the base frame 5.

The first rib 31, the second rib 32 and the third rib 33 are all linear ribs and arranged in a same plane (e.g. in the plane PL1), and there is no interrelation that one rib is stacked onto another rib. Each first rib 31 has a predetermined width in the second direction. This predetermined width may be constant over a distance (interspace) between the engagement elements 2 adjacent in the first direction and connected by the present first rib 31. Similarly, each second rib 32 has a predetermined width in the first direction. This predetermined width may be constant over a distance (interspace) between the engagement elements 2 adjacent in the second direction and connected by the present second rib 32. The third rib 33 may extend along one of the first and second directions and may have a constant predetermined width similar to the first rib 31 and the second rib 32. Such embodiment allows a portion for molding the locking surfaces 62 of the engagement heads 6 to be shaped like a block, thus facilitating simplified structure of the mold.

The group 4A of apertures includes a plurality of apertures 4 formed in a fastening region 15 (see FIG. 3) where the two-dimensional arrangement 20 is provided. The plurality of apertures 4 is formed in the fastening region 15, and the engagement elements 2 are connected by the ribs (particularly by the first and second ribs 31 and 32) in the fastening region 15. Each aperture 4 is a through hole penetrating through a portion of the fastening part 1 which is positioned in a same layer or in a same plane as the ribs (particularly the first ribs 31 and the second ribs 32), and allows spatial communication between upper and lower spaces relative to the plane where the ribs (particularly the first and second ribs 31 and 32) exist. Note that, in a case where the base frame 5 is provided, each aperture 4 penetrates through a portion of the fastening part 1 positioned in a same layer or in a same plane as the base frame 5. Typically, every aperture 4 is arranged in the plane PL1.

Typically, the plurality of apertures 4 are formed as net openings (in other words, two-dimensionally and regularly) in accordance with at least the plurality of first ribs 31 and the plurality of second ribs 32 in the fastening region 15. For example, the plurality of apertures 4 is formed corresponding to a plurality of unit cells in the planar lattice in which the engagement elements 2 are arranged at the respective lattice points. Total number of the apertures 4 in the fastening region 15 may be equal to or greater than 70% or 80% or 90% of the total number of the unit cells in the planar lattice. This would facilitate reduction of weight of the fastening part 1 and ensures higher softness of the fastening part 1. Each aperture 4 in the group 4A may be formed to have an aperture shape such as square, rectangle, parallelogram or rhombus in accordance with a type of the planar lattice. Each aperture 4 may be seized to have a same or different aperture area (a size of a net opening). Note that the aperture area of the aperture 4 indicates an aperture area of the aperture 4 in a same layer (same plane) as the ribs (particularly the first and second ribs 31 and 32) and/or the base frame 5, and it is irrelevant if it is partially covered by the engagement head 6 of the engagement element 2 or not. Minimum number of the aperture 4 which is sufficient to be formed as net openings may be 50% or 60% or 70% of the total number of unit cells in the planar lattice.

The aperture 4 may be defined by different portions dependent to its location in the fastening region 15. For example, an aperture 4 surrounded by the imaginary lines C1, C2, R2 and R4 is defined based on that the engagement elements 2 on each imaginary line R2,R4 are connected via the first rib 31 and the engagement elements 2 on each imaginary line C1,C2 are connected via the second ribs 32. Unlike this, an aperture 4 surrounded by the imaginary lines C1,C2,R2 and the base frame 5 is defined based on that the engagement elements 2 on the imaginary line R2 are connected via the first rib 31, the engagement elements 2 on each imaginary line C1,C2 are connected via the second rib 32, and furthermore the engagement element 2 on each imaginary line C1,C2 is connected to the base frame 5 via the third rib 33. An aperture 4 located at a corner of the rectangular fastening region 15 is defined based on that the engagement element 2 is connected to the base frame 5 via a third rib 33 extending in the first direction and via a third rib 33 extending in the second direction. As noted above, there are apertures 4 which do not require the first and second ribs 31,32 for a purpose of defining of the aperture 4 but these are few. It would be possible to further modify the shape of these apertures 4 by changing the shape of the base frame 5 and changing the length of the third rib 33.

Formation of the apertures 4 as net openings does not require that the apertures 4 are formed corresponding to all of the unit cells of the planar lattice. For example, it would be possible to seal one or more apertures 4 by thin portions. The thin portion prevents the mold protrusions from colliding with one another during a process of matching of molds, facilitating the prolonged lifespan of mold protrusions. The thin portion may have a thickness equivalent to that of the base frame 5.

Reticulated or mesh structure is built from the two-dimensional arrangement 20, the first rib 31, and the second rib 32 (and optionally the third ribs 33) in the fastening region 15. The base frame 5 is arranged to surround the fastening region 15 (also the mesh structure), reinforcing the mechanical strength of the fastening part 1 while ensuring its adequately high softness. In a case where the base frame 5 is arranged, the base frame 5 may be sewn or glued or adhered to an article, allowing easier and simple attachment of the fastening part 1 to that article. The base frame 5 includes a pair of frame portions 51 extending in the first direction and a pair of frame portions 52 extending in the second direction. The frame portions 51 are spaced by a constant interspace in the second direction. The frame portions 52 are spaced by a constant interspace in the first direction. Note that an embodiment is envisaged where the frame portions extend in a direction different from the first and second directions. The base frame 5 exists in the plane PL1.

Descriptions will be made with reference to FIGS. 6 to 8. The first rib 31 and/or the second rib 32 may be formed thicker than the base frame 5. This allows suitable balancing of the mechanical strength, softness and sewing-easiness of the fastening part 1. Note that the third rib 33 may be thinner than the first rib 31 and/or the second rib 32, e.g. it may be formed to have a same thickness as the base frame 5.

Groove 8 is formed between two engagement element 2 adjacently arranged in the first direction, and the groove 8 extends from an open end interposed between the engagement heads 6 of those engagement elements 2 to a bottom end defined by the first rib 31. Similarly, a groove 8 is formed between two engagement element 2 adjacently arranged in the second direction, and the groove 8 extends from an open end interposed between the engagement heads 6 of those engagement elements 2 to a bottom end defined by the second rib 32. The first and second rib 31,32 are thinned by such grooves 8, allowing easier deformation of the engagement elements 2 and facilitating smoother engagement of fastening parts 1.

In the present embodiment as seen in the referenced figures, the plurality of first ribs 31 and/or the plurality of second ribs 32 is arranged to allow the group 4A of apertures (i.e. a plurality of apertures) to include two or more apertures 4 each having an aperture area corresponding to two or more unit cells of the planar lattice. This enables higher softness of the fastening part 1 and reduction of total number of block portions in a mold used for production of fastening part 1. Increase in aperture area of the two or more apertures also allows reduction of material cost. In a case where the engagement elements 2 are used in each of which no gap is formed between the engagement head 6 and the stem 7, the above-described configuration facilitates displacement and deformation of the engagement elements 2.

No that, in an illustrated example of FIGS. 3 and 4, the plurality of first ribs 31 is arranged to allow the group 4A of apertures to include the above-noted two or more apertures 4, but the plurality of second ribs 32 is not arranged as such. A fundamental point lies in omitting (i.e. subtracting) two or more first ribs from the total number of first ribs allocatable for connection between the engagement elements 2 (or lattice points) adjacent in the first direction with respect to the planar lattice and, additionally or alternatively in omitting (i.e. subtracting) two or more second ribs from the total number of second ribs allocatable for connection between the engagement elements 2 (or lattice points) adjacent in the second direction with respect to the planar lattice. Note that typically, a single molded portion is used as a rib for connection between the engagement elements 2 (or the lattice points).

An aperture (referred to as an A-aperture) surrounded by the imaginary lines C1,C2,R2,R4 has an aperture area corresponding to two unit cells of the planar lattice. Additionally to this aperture, the same holds true to an aperture (referred to as a B-aperture) surrounded by the imaginary lines C2,C3,R1,R3, aperture (referred to as a C-aperture) surrounded by the imaginary lines C2,C3,R3,R5, and aperture (referred to as a D-aperture) surrounded by the imaginary lines C3,C4,R2,R4. Each of the A-D apertures is wider in the second direction and narrower in the first direction. It is of course possible to form the A-D apertures to be wider in the first direction and narrower in the second direction. Practical benefit lies in a case where the A-D apertures each has an aperture area corresponding to two or three unit cells of the planar lattice. That is, in a case where the A-D apertures each has an aperture area corresponding to four or more unit cells, there may be a possibility of reduced mechanical strength of the fastening part 1 outside its permissible extent.

Now referring to FIG. 4, the total number of first ribs 31 allocatable in the fastening region 15 is 15. In connection to this, the number of first ribs 31 actually arranged in the fastening region 15 is 7. That is, a number of first rib 31 may be equal to or less than ⅔ or ½ of the total number of first ribs 31 allocatable for connection between the engagement elements 2 in the fastening region 15 (or in the planar lattice). Such reduction (i.e. subtraction) in number of first ribs 31 allows easier formation of aperture having an aperture area corresponding to two or more unit cells. Note that just one first rib 31 is used for connecting adjacent two engagement elements 2.

We now refer to FIG. 4 for further descriptions, the total number of the second ribs 32 allocatable in the fastening region 15 is 16. In connection to this, the number of second ribs 32 actually arranged in the fastening region 15 is 16. That is, the number of second ribs 32 is equal to the total number of second ribs 32 allocatable for connection between the engagement elements 2 in the fastening region 15 (or in the planar lattice). This ensures a desired mechanical strength of the fastening part 1 despite of the above-described subtraction of the first ribs 31. Note that just one second rib 32 is used for connecting adjacent two engagement elements 2.

FIG. 9 is a schematic perspective view of a fastening device constructed from a pair of fastening parts 1,1' which are made of same material and structured identically. FIG. 10 is an elevational view of the fastening device illustrating a manner of engagement between the fastening parts 1,1'. FIG. 11 is a cross-sectional view of the fastening device illustrating a manner of engagement between the fastening parts 1,1'. With respect to the illustrated fastening parts 1,1' illustrated in FIGS. 9-11, the fastening part 1 would be referred to as a lower part and the fastening part 1' would be referred to as an upper part.

Referring to FIG. 11, the upper part 1' is gently pushed down for a purpose of engaging the upper and lower parts 1',1 together, the engagement elements 2 of the upper and lower parts are brought into contact in their respective top surfaces 61 and the both parts would be brought into proper alignment. As the upper part 1' is pushed down to the lower part 1, the engagement element 2 of the lower part 1 passes by the engagement head 6 of the engagement element 2 of the upper part 1' and enters into the aperture 4 of the upper part 1', and the engagement elements 2 of the upper and lower parts 1,1' would be brought into contact each other at their respective locking surfaces 62. In that manner, the upper and lower parts 1,1' are engaged. A peripheral end of the upper part 1' may be grasped and pulled away from the lower part 1 so that the upper and lower parts 1,1' would be disengaged. Note that, in a state shown in FIG. 10, the engagement heads of the engagement elements 2 of the lower part 1 can be seen by eyes through the apertures 4 of the upper part 1'. As the upper part 1' and the lower part 1 have been fully engaged, there is an interspace between the plane PL1' in which the planar lattice of the upper part 1' exists and the plane PL1 in which the planar lattice of the lower part 1 exists. This interspace may be substantially equal to the height of the engagement element 2, but not necessarily limited to this. Furthermore as the upper part 1' and the lower part 1 are equally sized, there are offsets between positions of peripheral rims of the upper and lower parts 1' and 1 as indicated by the arrows in FIG. 11, and they are not stacked in a way to perfectly match one another.

The fastening part 1 can be produced by injection molding using a mold device built from a first mold 100 shown in FIG. 12 and a second mold 200 shown in FIG. 13. For example, the second mold 200 is a stationary mold, and the first mold 100 is a movable mold and is moved up and down relative to the second mold 200. The first mold 100 shown in FIG. 12 has a main surface 101 formed corresponding to the fastening region 15, protrusions 103 for thinning the third ribs 33, a plurality of recesses 106 each for forming the engagement head 6 of the engagement element 2 of the two-dimensional arrangement 20, and protrusions 108 for forming the above-described grooves 8 in the first and second ribs 31 and 32. The recess 106 is recessed from the main surface 101. The protrusions 103 and the protrusions 108 are raised from the main surface 101. Step may be formed along the periphery of the main surface 101 to ensure the thickness of the first and second ribs 31 and 32.

The second mold 200 shown in FIG. 13 has a plurality of block portions 204 arranged corresponding to the plurality of apertures 4. Grooves 201,202,203 are formed between the block portions 204 to mold the ribs (the first to third ribs 31, 32, 33) and/or the stem walls (the first and second stem walls 71 and 72). Among the block portions 204, there are two or more block portions (see 204B) included each of which has an area corresponding to the two or more unit cells of the planar lattice discussed above for the fastening part 1 when the main surface of the second mold 200 is viewed in front as illustrated in FIG. 13. This enables increased strength of the block portions and facilitates the prolonged lifespan of the second mold 200.

When the first mold 100 and the second mold 200 are matched together, the block portion 204 is in contact with the main surface 101 of the first mold 100, thereby defining a molding cavity for the fastening part 1. Preferably, the plurality of block portions 204 includes plural types of block portions 204 which are different in width or length orthogonal to the width when the main surface of the second mold 200 is viewed in front. This may contribute to satisfy a restriction of the shape of fastening part 1 additionally to the softness and mechanical strength of fastening part 1. Note that each block portion 204 may have a main block surface (which is rectangular when viewed in front, for example) that will be in contact with the main surface 101 of the first mold 100, and a plurality of sidewall surfaces (e.g. 4 sidewall surfaces) each extending in a depth direction of the groove from a rim of the main block surface. Here again, the two or more block portions may have respective main block surfaces each having an area corresponding to the two or more unit cells of the planar lattice, enabling the increased strength of the block portions and facilitating the prolonged lifespan of the second mold 200. The main block surface may typically be a flat surface. If the aperture shape of the aperture 4 is modified, then the shape of the block portion 204 would be modified accordingly. Note that, the sidewall surface of the block portion 204 may have a draft, i.e. it may be a non-vertical surface with draft but should not be limited to this, and it may be a vertical surface without draft.

Another embodiment will be discussed with reference to FIGS. 14-17, but the above-discussed various features and any combination of them would be similarly applicable here. FIG. 14 is a perspective upside schematic of a fastening part according to another aspect of the present disclosure. FIG. 15 is a perspective downside schematic of the fastening part of FIG. 14. FIG. 16 is a schematic top view of the fastening part of FIG. 14. FIG. 17 is a schematic bottom view of the fastening part of FIG. 14. As shown in FIGS. 14-17, the square lattice is set obliquely to the base frame 5 and as a result of this, the first to third ribs 31-33 extend obliquely (compared with FIGS. 3 and 4). Even in this embodiment, the subtraction of the first rib 31 and/or the second rib 32 enables similar effects as those discussed above.

The fastening part 1 can be produced in a way other than the injection molding as schematically shown in FIG. 18. In FIG. 18, the first mold 100 is provided as a first die-wheel and the second mold is provided as a second die-wheel. Mold structure shown in FIG. 12 is continuously formed in the circumferential surface of the first die-wheel. Mold structure shown in FIG. 13 is continuously formed in the circumferential surface of the second die-wheel. The first die-wheel and the second die-wheel are arranged adjacently with a predetermined minimum gap therebetween and controlled to rotate continuously. Molten material is supplied from an extruder 300 to the interspace between the first and second die-wheels so that the fastening parts 1 are continuously formed.

Based on the above teachings, a skilled person in the art would be able to add various modifications to the respective features and embodiments. Reference codes in Claims are just for reference and should not be referred for the purpose of narrowly construing the scope of claims.

The invention claimed is:

1. A fastening part comprising:
    a two-dimensional arrangement of engagement elements including a plurality of engagement elements arranged corresponding to a plurality of lattice points of a planar lattice;
    a plurality of first ribs each connecting the engagement elements adjacently arranged in a first direction in the two-dimensional arrangement;
    a plurality of second ribs each connecting the engagement elements adjacently arranged in a second direction in the two-dimensional arrangement, the second direction different from the first direction; and
    a plurality of apertures formed in a fastening region in which the two-dimensional arrangement is provided,
    wherein the plurality of apertures includes a set of first apertures and a set of second apertures, the second aperture having an aperture area greater than an aperture area of the first aperture, and
    wherein the plurality of first ribs is arranged to allow the plurality of apertures to include the set of second apertures, each of the second apertures having the aperture area corresponding to two or more unit cells of the planar lattice thereby each of the second apertures being surrounded at least by six engagement elements.

2. The fastening part of claim 1, wherein the plurality of apertures is formed as net openings in accordance with at least the plurality of first ribs and the plurality of second ribs in the fastening region.

3. The fastening part of claim 2, wherein each of the second apertures is wider in one direction of the first and second directions and narrower in an other direction of the first and second directions.

4. The fastening part of claim 3, wherein each of the second apertures has the aperture area corresponding to two or three unit cells in the planar lattice.

5. The fastening part of claim 1, wherein an aperture shape of the first aperture is square, rectangle, parallelogram, or rhombus, and
    wherein an aperture shape of the second aperture is square, rectangle, parallelogram or rhombus.

6. The fastening part of claim 1, further comprising:
    a base frame that surrounds the fastening region; and
    a plurality of third ribs each connecting, to the base frame, the engagement element at outermost position in the two-dimensional arrangement.

7. The fastening part of claim 6, wherein the first ribs and the second ribs are thicker than the base frame in a direction perpendicular to the planar lattice, and the third rib is thinner than the first rib and/or the second rib in the direction perpendicular to the planar lattice.

8. The fastening part of claim 6, wherein the plurality of apertures includes a set of third apertures, the third aperture having an aperture area lesser than the aperture area of the first aperture.

9. The fastening part of claim 1, wherein each engagement element of the plurality of engagement elements includes at least an engagement head and a stem, the stem having a T-shaped cross section in a plane parallel to the planar lattice.

10. The fastening part of claim 9, wherein the stem includes:
    a first stem wall connected to the engagement head, the first stem wall having a first width ranging from one end to an other end of the engagement head in one direction of the first and second directions; and
    a second stem wall connected to the engagement head, the second stem wall having a second width ranging from one end of the engagement head to the first stem wall in the other direction of the first and second directions.

11. The fastening part of claim 9, wherein the engagement head includes a curved top surface and a flat locking surface located at an opposite side of the top surface.

12. The fastening part of claim 11, wherein a number of the second ribs is equal to a total number of the second ribs allocatable for connection between the engagement elements in the fastening region.

13. The fastening part of claim 1, wherein a number of the first ribs is less than ⅔ or ½ of a total number of the first ribs allocatable for connection between the engagement elements in the fastening region.

14. The fastening part of claim 1, wherein a density of the engagement elements in the two-dimensional arrangement is in a range of 2 to 28 elements per $cm^2$.

15. The fastening part of claim 1, wherein the first aperture has a rectangular aperture shape, and the second aperture has a rectangular aperture shape.

* * * * *